United States Patent
Terry

(10) Patent No.: US 7,018,463 B2
(45) Date of Patent: Mar. 28, 2006

(54) ABRASION RESISTANT COATING COMPOSITION

(75) Inventor: Karl W. Terry, Huntington Beach, CA (US)

(73) Assignee: Lens Technology I, LLC, La Mirada, CA (US)

( * ) Notice: Subject to any disclaimer, the term of this patent is extended or adjusted under 35 U.S.C. 154(b) by 152 days.

(21) Appl. No.: 10/626,144

(22) Filed: Jul. 24, 2003

(65) Prior Publication Data

US 2005/0020758 A1    Jan. 27, 2005

(51) Int. Cl.
C09D 183/06    (2006.01)

(52) U.S. Cl. .......................... 106/287.13; 106/287.16; 528/34; 524/356; 524/366; 524/379; 524/430; 524/492; 524/493

(58) Field of Classification Search ............. 106/287.1; 528/34
See application file for complete search history.

(56) References Cited

U.S. PATENT DOCUMENTS

| | | | |
|---|---|---|---|
| 5,856,018 A | 1/1999 | Chen et al. | |
| 6,057,039 A * | 5/2000 | Takeshita et al. | 428/447 |
| 6,342,097 B1 | 1/2002 | Terry et al. | |
| 6,348,269 B1 | 2/2002 | Terry et al. | |
| 2001/0018129 A1 * | 8/2001 | Shiota et al. | 428/447 |
| 2003/0118737 A1 * | 6/2003 | Valeri et al. | 427/387 |
| 2005/0031791 A1 * | 2/2005 | Sasaki et al. | 427/372.2 |

FOREIGN PATENT DOCUMENTS

WO    WO 03/052003    * 6/2003

* cited by examiner

*Primary Examiner*—Marc S Zimmer
(74) *Attorney, Agent, or Firm*—Stetina Brunda Garred & Brucker

(57) ABSTRACT

Liquid coating compositions and methods for formulating the same are disclosed. The compositions comprise the combination of an epoxy-functional silane, a multipodal silane, and a strong acid dispersed within a solvent. The liquid coating compositions are formulated to be applied to a substrate and thereafter cured. The resultant coating is transparent and abrasion-resistant. The coating may include additional additives or may be specifically formulated to possess specific properties as may be desired for a specific application. Such coating compositions can further be formulated such that the refractive index thereof can be adjusted to correspond to the refractive index of the substrate to which the liquid coating compositions are applied.

26 Claims, No Drawings

ABRASION RESISTANT COATING COMPOSITION

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention is directed to liquid coating compositions and methods for forming the same that, when applied to a substrate, are useful in forming transparent, abrasion resistant coatings thereon. Such coating compositions can further preferably be formulated such that the refractive index thereof can be adjusted to correspond to the refractive index of the substrate Previously, transparent coatings have been described for plastic materials where there is a need for abrasion resistance. Exemplary of such coatings include those disclosed in U.S. Pat. No. 4,355,135, issued to James January on Oct. 19, 1982, entitled TINTABLE ABRASION RESISTANT COATINGS; U.S. Pat. No. 6,001,163 issued to Harvey, et al. on Dec. 14, 1999 entitled COMPOSITION FOR PROVIDING AN ABRASION RESISTANT COATING ON A SUBSTRATE; U.S. Pat. No. 6,348,269 issued to Terry on Feb. 19, 2002 entitled COMPOSITION FOR PROVIDING AN ABRASION RESISTANT COATING ON A SUBSTRATE HAVING IMPROVED ADHESION AND IMPROVED RESISTANCE TO CRACK FORMATION, the teachings of all of which are expressly incorporated herein by reference. Likewise known in the art are coating compositions that have been formulated to impart abrasion resistance that further possess a tunable refractive index. Examples of such coatings include those disclosed in U.S. Pat. No. 5,322,888 issued to Kato, et al. on Jun. 21, 1994 entitled COATING COMPOSITION FOR OPTICAL PLASTIC MOLDINGS; U.S. Pat. No. 6,342,097 issued to Terry, et al. on Jan. 29, 2002 entitled COMPOSITION FOR PROVIDING AN ABRASION RESISTANT COATING ON A SUBSTRATE WITH A MATCHED REFRACTIVE INDEX AND CONTROLLED TINTABILITY; U.S. Pat. No. 6,538,092 issued to Terry, et al. on Mar. 25, 2003 entitled COMPOSITION FOR PROVIDING AN ABRASION RESISTANT COATING ON A SUBSTRATE WITH A MATCHED REFRACTIVE INDEX:2, the teachings of all of which are expressly incorporated herein by reference.

Such compositions, however, have been largely limited to using a carboxylic acid and/or a carboxylic anhydride which may or may not be used in combination with a strong or mineral acid for the hydrolysis catalyst. U.S. Pat. No. 4,355,135 specifies the polyfunctional carboxylic acid and polyfunctional anhydride compounds as cross linking components wherein there is preferably equimolar amounts of both the epoxy and carboxylate functional groups to thus enable the carboxylate groups of the coating composition to condense with the epoxy groups of the coating composition. U.S. Pat. No. 6,001,163 and U.S. Pat. No. 6,538,092 describe poly and/or multi-functional carboxylic acids and anhydrides as cross linking components which are thought to provide matrix enhancement. U.S. Pat. No. 4,355,135 specifies, however, that sometimes the polyfunctional carboxylic acid is partially or fully incompatible with the coating matrix. In this regard, such incompatibility becomes apparent during the thermal curing step where the solid carboxylic acid component crystallizes to the surface of the coating matrix. For example, U.S. Pat. No. 5,322,888 describes the incompatibility of the polycarboxylic acid as a concentration effect. While using a lower concentration of a polyfunctional carboxylic acid may solve the incompatibility problem, such lesser concentration of acid will typically restrict the amount of basic condensation catalysts which can be used due to the reduced stability of higher pH compositions.

Accordingly, there is a substantial need in the art for a coating composition that is operative to form a transparent, abrasion resistant coating that can further preferably be formulated to have a tunable refractive index that also eliminates all known deficiencies in the art associated with coatings which incorporate the use of carboxylic acid or carboxylic anhydrides. There is likewise a need in the art for such a coating that further utilizes substantially less material; i.e., acid (of an order of several magnitudes) which in turn provides for a significantly more homogeneous coating matrix. There is still further a need in the art for such a coating that, by virtue of utilizing significantly less material provides for a significantly more homogeneous coating matrix. There is still further a need in the art for such a coating that is of simple formulation, cost-effective to produce and apply, can be utilized in a substantial number of applications, utilizes components that are relatively inexpensive and commercially available, can be deployed utilizing virtually any type of conventional coating deposition process, and further can form an abrasion resistant coating without the presence of a poly or multifunctional carboxylic acid or anhydride cross linking compound to thus eliminate all unfavorable properties associated therewith.

BRIEF SUMMARY OF THE INVENTION

The present invention specifically addresses and alleviates the above-identified deficiencies in the art. In this regard, the present invention is directed to novel liquid coating compositions and methods of preparing and applying the same that are operative to form a transparent, abrasion resistant coating that may further be preferably formulated such that the refractive index thereof can be adjusted to correspond to the refractive index of the substrate to which the coatings are applied. The coating compositions are comprised of the combination of an epoxy-functional silane, a multipodal silane, and a strong acid that are combined with a solvent, which may be either an aqueous solvent, an organic solvent, or non-polar liquid. To the extent desired, additional compositions may be added, such as silane additives, colloidal silica additives, metal oxide composite colloid additives, organic functional additives, condensation catalysts, surfactants and/or an optional cationic or free radical photoinitiator, as may be desired for a particular coating application. Advantageously, the coating compositions of the present invention eliminate the use of carboxylic acids or carboxylic anhydrides. As a consequence, the use of liquid and solid strong acid hydrolyses catalysts allow substantially less material, on the order of a ten (10) fold decrease, to be utilized which in turn provides for a significantly more homogeneous coating matrix and eliminates the restrictions and undesirable properties brought forth from the use of carboxylic acid or carboxylic anhydrides.

The present invention also comprises processes for forming the coating compositions onto an article, and articles having such coating compositions formed thereon. To that end, it is contemplated that the coating compositions of the present invention may be applied in a wide variety of applications wherever it is desired to form an abrasion resistant coating having a specific type of refractive index. Forming such coating comprises the steps of providing the compositions of the present invention, applying them to a substrate upon which the coating is to be formed, and curing the substrate with composition formed thereon. The steps of applying the composition and curing the same may be performed via any technique known in the art.

While not intending to limit the use of the compositions for such applications, it is contemplated that such compositions will be particularly well suited for use in optical fabrication processes, and in particular lens manufacturing processes where it is typically desirable to form a protective coating upon the lens, such as those formed from cast resins, polycarbonate and other like materials. It is likewise contemplated that the coatings of the present invention may be utilized in a wide variety of other articles of manufacture wherever it may be desired to form a protective coating upon a surface or substrate thereof, especially if formed of metal, glass and/or plastic. Along these lines, it is contemplated that all conventional coating deposition techniques known in the art may be utilized in the practice of the present invention.

DETAILED DESCRIPTION OF THE INVENTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

The coating compositions of the present invention encompass the unique combination of an epoxy-functional silane, a multipodal silane, and a strong acid that when combined with a solvent, such as an aqueous solvent, non-polar liquid, organic solvent, or combinations thereof, are operative to form a coating composition when applied to a substrate and cured thereon. As discussed in greater detail below, the compositions may further optionally include; silane additives, colloidal silica additives, metal oxide composite colloid additives, organic functional additives, condensation catalysts, surfactants and/or optional cationic and radical photoinitiators. One who is skilled in the art will understand that the extent of reactivity of the various components of the coating composition will greatly depend on the concentration and type of the components that comprise the coating composition, and that the extent of reactivity, concentration and type of the various components of the coating composition will reflect on the total overall performance of the cured coating material.

The epoxy-functional silanes of the present invention can be represented by the formula $(R^1)_xSi(OR^2)_{4-x}$; where x is an integer equal to 1, 2, 3, or 4 and $R^1$ is any combination of an epoxy-functional group, H, an alkyl group, an hydroxyalkyl group, alkyl ether group, alkylene group, and/or an aryl group; where each of which may contain from at least 1 to 15 carbon atoms (when $R^1$ is not H) where at least one of the $R^1$ groups must contain an epoxy functional group. $R^2$ is any combination of H, an alkyl group, an alkylene group, an alkyl ether group, where each may contain from at least 1 to 15 carbon atoms (when $R^2$ is not H) and/or an $(R^3)_x(OR^4)_{3-x}$Si— group; where $R^3$ is any combination of H, an alkyl group, an hydroxyalkyl group, alkyl ether group, alkylene group, and/or an aryl group where each may contain from at least 1 to 15 carbon atoms (when $R^3$ is not H) where one of the $R^3$ groups may contain an epoxy functional group. $R^4$ can be any combination of H, an alkyl group, an alkylene group, an alkyl ether group, where each may contain from at least 1 to 12 carbon atoms (when $R^4$ is not H) and/or another $(R^3)_x(OR^4)_{3-x}$Si— group. The epoxy-functional silanes of the present invention can also be represented by the formula $(R^5SiO)_x(OR^6)_y$; where if x is an integer of 8 or 12, then y is 0. If x is 6 then y is 0 or 8 and if x is 7, y is 3. Alternatively, the formula $(R^5SiO)_x(OR^6)_y$ may be designated $R^5TX(OR^6)_y$. $R^5$ is any combination of an epoxy-functional group, H or an alkyl group, an hydroxyalkyl group, alkyl ether group, alkylene group, and/or an aryl group; where each of which may contain from at least 1 to 12 carbon atoms (when $R^5$ is not H). $R^6$ can be any combination of an epoxy-functional group, H, an alkyl group, an alkylene group, an alkyl ether group, and/or an aryl group, where each may contain from at least 1 to 15 carbon atoms (when $R^8$ is not H). Either $R^5$ or $R^6$ must contain at least one epoxy-functional group and may also be represented by the formula $(R^1)_xSi(OR^2)_{4-x}$, (vide supra). These types of molecules are herein referred to as polyhedraloligosilsesquioxanes or POSS molecules.

Examples of epoxy-functional silanes of the present invention include, but are not limited to (3-glycidoxypropyl) trimethoxysilane, (3-glycidoxypropyl)triethoxysilane, (3-glycidoxypropyl) tripropoxysilane, (3-glycidoxypropyl) dimethoxymethylsilane, (3-glycidoxypropyl) dimethylmethoxysilane, 2,3-epoxypropyltriethoxysilane, 3,4-epoxybutyltriethoxysilane, 4,5-epoxypentyltriethoxysilane, 5,6-epoxyhexyltriethoxysilane, 2-(3,4-epoxycyclohexyl) ethyltriethoxysilane, 2-(3,4-epoxycyclohexyl) ethyltrimethoxysilane, 1,3 bis(glycidoxypropyl) tetramethoxydisiloxane, 1,3 bis(glycidoxypropyl) tetraethoxydisiloxane, 1,3 bis(glycidoxypropyl)-1,3-dimethoxy-1,3-dimethyldisiloxane, and 1,3 bis (glycidoxypropyl)-1,3-diethoxy-1,3-dimethyldisiloxane. Examples of epoxy-functional POSS molecules are epoxy-propyl-heptaisobutyl-T8-POSS, (3-glycidoxy-propyl)hepta-ethyl-T8-POSS, (3-glycidoxy-propyl) heptaisobutyl-T8-POSS, (3-glycidoxy-propyl)heptaphenyl-T8-POSS, octa(3-glycidoxy-propyl) dimethylsilyl-T8-POSS, tris(3-glycidoxy-propyl)dimethylsilyl-heptaethyl-T7-POSS, tris (3-glycidoxy-propyl) dimethylsilyl-heptaisobutyl-T7-POSS, and like epoxy functional POSS molecules.

The multipodal silanes of the present invention are represented by the formula $((R^7O)_{3-x}R_x^8Si)_yR^9$; where x is an integer equal to 0, 1, or 2. $R^7$ is any combination of H, an alkyl group, alkyl ether group, alkylene group, aryl group where each of which may possess from about 1 to 15 carbon atoms (when $R^7$ is not H). $R^8$ is any combination of H, an alkyl group, an alkene group, an alkylether group, an aryl group where each may possess from about 1 to 15 carbon atoms (when $R^8$ is not H). The $R^9$ moiety is further defined by atoms C, H, and E wherein C, H, and E designate carbon, hydrogen and an heteroatom, respectively. The $R^9$ moiety may comprise any combination of an alkyl group, an alkene group, an alkyl ether group, an aryl group, an amino alkyl group, an amino alkene group, an amino alkyl ether group, an amino aryl group, where each of which may contain from about 1 to 20 carbon atoms. The $R^9$ moiety may also contain up to 10 heteroatoms, such as; S, B, N, P, Ge, and Sn, wherein the heteroatoms may be bonded to another heteroatom, silicon, carbon, oxygen, and/or H, or any combination of a heteroatom, silicon, carbon, oxygen and H. The $((R^7O)_{3-x}R_x^8Si)_y$ moiety may be bonded to the $R^9$ backbone wherein the $R^9$ backbone may be linear, hyperbranched, or dendritic in nature and the $((R^7O)_{3-x}R_x^8Si)_y$ moiety may be bonded to any selected carbon and/or heteroatoms contained in the $R^9$ backbone to yield either a symmetrical or unsymmetrical multipodal silane. The connectivity of the $((R^7O)_{3-x}R_x^8Si)_y$ moiety to each available carbon or heteroatom is designated by the integer y, wherein y may be equal to 1, 2, 3, or 4 for C, 1 for S, 1 or 2, for B, N and P, and/or 1, 2, or 3 for Ge and Sn or any combination depending on the structure and the constituents of the $R^9$ backbone.

Exemplary of the types of multipodal silanes capable of being utilized in the practice of the present invention include, but are not limited to bis(triethoxysilyl) methane, bis (triethoxysilyl)ethane, bis(trimethoxysilyl) methane, bis (trimethoxysilyl)ethane, hexachlorodisilylethane, trans-bis (triethoxysilyl)ethylene, cis-bis(triethoxysilyl)ethylene, 1,1-bis(trimethoxysilylmethyl)ethylene, 1,1-bis (triethoxysilylmethyl)ethylene, 1,3-bis(triethoxysilyl) propane, 1,3-bis(trimethoxysilyl)propane, 1,4-bis (trimethoxysilyl)butane, 1,4-bis (triethoxysilyl)butane, 1,5-bis(trimethoxysilyl)pentane, 1,5-bis(triethoxysilyl)pentane, 1,3-bis(triethoxysilyl)propene, 1,3-bis(trimethoxysilyl)propene, 1,4-bis(trimethoxysilyl) butene, 1,4-bis(triethoxysilyl) butene, 1,5-bis(trimethoxysilyl)pentene, 1,5-bis(triethoxysilyl) pentene, 1,4-bis(triethoxysilyl)benzene, 1,3-bis (triethoxysilyl)benzene, bis(trimethoxypropyl)amine, bis [(3-trimethoxysilyl)propyl]ethylenediamine, bis[(3-triethoxysilyl)propyl]urea, 1,2,3-tris(triethoxysilyl)propane, 1,1,3-tris(triethoxysilyl)propane, 1,1,3,3-tetrakis(triethoxysilyl)propane, tris-beta-(triethoxysilyl)ethylamine, tetrakis (triethoxysilyl)methane, tris(triethoxysilyl)methane.

The strong acids of the present invention are useful as hydrolysis catalysts for the alkoxy-silane components which are present in the coating composition and may also be used during a re-acidification step after addition of a basic condensation catalyst. The strong acids of the present invention can either be fully or near fully dissociated or possess a pKa1 less than about 3 and do not possess a carboxyl group. The preferred strong acids of the present invention have a boiling point greater 20 C at atmospheric pressure. Examples of preferred strong acids of the present invention are phosphoric acid, phosphorus acid, sulfuric acid, sulfurous acid, nitric acid, nitrous acid, and alkyl and aryl sulfonic and di-sulfonic acids. The strong acids of the present invention, which are not alkyl and aryl-sulfonic acids, can be represented by the formula $H_xEO_y$; where x is an integer of 1, 2, 3, or 4 and y is an integer of 2, 3, or 4, and E is an element contained in the series P, S, N, Te, and Se. The alkyl and aryl sulfonic acids of the present invention can be represented by the formula $Z_xR^{10}(SO_3H)_y$; where x is an integer of 1, 2, 3, or 4, y is an integer of 1, 2, or 3 and $R^{10}$ can be any combination of an alkyl, alkylene, alkyl-ether, an aryl group where each of which may possess from about 1 to about 20 carbon atoms. Z can be any combination of H, a hydroxyl group, an amino group, and alkyl amino group, an alkoxy group, and/or a halogen atom, where each of which may possess from about 1 to about 20 carbon atoms, when Z is not H, an hydroxyl group, an amino group, or an halogen atom.

Examples of sulfonic and di-sulfonic acids of the present invention include, but are not limited to methanesulfonic acid, ethanesulfonic acid, ethane-di-sulfonic acid, propane-sulfonic acid, benzenesulfonic acid, p-toluenesulfonic acid, styrenesulfonic acid, dinonylnaphthalenesulfonic acid, dinonylnaphthalene-di-sulfonic acid, dodecylbenzenesulfonic acid, 2-hydroxy-4-methoxybenzophenone-5-sulfonic acid, 10-camphorsulfonic acid, and 2-acrylamido-2-methyl-1-propanesulfonic acid.

The amount of aqueous solvent, namely, water, that is present in the coating composition should be sufficient so that the coating composition may form a film which covers the article to which it is applied. The amount of water present in the composition may range from 1 to 95 percent of the total weight of the composition. More preferably, the amount of water present in the composition may range from 15 to 50 percent of the total weight of the composition. One who is skilled in the art will realize that compositions which possess reduced concentrations of water will require longer hydrolysis reaction times and/or an increased amount of hydrolysis catalyst to form a coating composition which provides a film with efficient and even spreading.

The organic solvent portion of the present invention is comprised of organic solvents which are miscible with water and which are compatible with the other components which define the composition. The preferred solvents are alcohols and glycol ethers which when combined with water and the other components which comprise the coating composition provide a homogeneous coating composition. One who is skilled in the art will realize that the boiling points and binary and ternary eutectics, which may be formed by selection of appropriate solvents and their respective concentrations, will dictate the time and temperature which is needed to sufficiently cure the coating composition. The amount of organic solvent present in the coating composition may range from 5 to 95 percent of the total weight of the composition. More preferably the amount of organic solvent present in the coating composition may range from 15 to 75 percent of the total weight of the composition. The organic solvents of the coating composition can be represented by the formula $R^{11}-(OR^{12})_x-O-R^{11}$; where x is an integer equal to 0, 1, 2 or 3, $R^{11}$ is any combination of H, an alkyl group from 1 to 10 carbon atoms (when $R^{11}$ is not H) and $R^{12}$ is any combination of an alkyl group, an alkylene group, and/or an aryl group where each of which may contain from about 1 to 12 carbon atoms.

Examples of alcohols and ethers of the present invention include, but are not limited to methanol, ethanol, n-propanol, iso-propanol, n-butanol, sec-butanol, iso-butanol, propylene glycol methyl ether, propylene glycol ethyl ether, propylene glycol propyl ether, methylene glycol methyl ether, methylene glycol ethyl ether, ethylene glycol methyl ether, ethylene glycol ethyl ether, propylene glycol ethyl ether, propylene glycol di-ethyl ether, propylene glycol di-methyl ether, propylene glycol di-propyl ether, methylene glycol di-methyl ether, methylene glycol di-ethyl ether, ethylene glycol di-methyl ether, ethylene glycol di-ethyl ether, and propylene glycol di-ethyl ether.

Cyclic ethers such as tetrahydrofuran and dioxane may be used as solvents in the coating composition. Ketones such as acetone, methyl ethyl ketone, benzyl methyl ketone, diethyl ketone, and diacetone alcohol may also be used as solvents on the coating composition. Non-polar liquids may likewise be used in the composition, however, as will be recognized, their concentration must not have an adverse affect on the over all homogeneity of the coating composition. Examples of non-polar liquids which may be used in the composition include, pentane, hexane, heptane, octane, toluene, xylene, and like solvents.

The total solids of the composition are comprised of the non-volatile components of the coating composition, and may range from 1 to 99 percent of the total weight of the composition. Preferably, the total solids of the composition may range from 10 to 60 percent of the total weight of the composition. Most preferably, the total solids of the composition may range from 15 to 30 percent of the total weight of the composition. The molar ratio of the epoxy-functional silane to the multipodal silane may range from 0.05:1 to 10:1, and preferably between 0.3:1 to 0.7:1. The molar ratio of the strong acid to the epoxy-functional silane may range from 0.001:1 to 0.5:1, and preferably from 0.02:1 to 0.15:1.

The coating compositions of the present invention may also contain optional condensation catalysts. As is known in the art, such catalysts increase the extent of condensation and may enhance the abrasion resistance, hardness, and the general resistance to exposure of the cured coating composition. Base catalyzed condensation can be afforded by titration with a caustic solution such as an aqueous solution or an aqueous organic solution of NaOH or KOH. Addition of basic colloidal silica can also accomplish this end. Colloidal silica may also provide a composite effect.

Amine and amide condensation catalysts may also be used with the composition. The amine and amide catalysts of the present invention may be represented by the formula $NR_3^{13}$ where $R^{13}$ is any combination of H, an acyl, a nitrile group, a hydroxy group, a trialkylsilyl group, an alkyl group, alkyl ether group, alkylene group, aryl group where each of which may possess from about 1 to 15 carbon atoms (when $R^{13}$ is not H, a nitrile group, or a hydroxy group) and/or another $-NR_2^{14}$ group, where $R^{14}$ is any combination of H, an acyl, a nitrile group, a hydroxy group, a trialkylsilyl group, an alkyl group, alkyl ether group, alkylene group, aryl group where each of which may possess from about 1 to 15 carbon atoms (when $R^{14}$ is not H, a nitrile group, or a hydroxy group) or another $-NR_2^{14}$ group. Also, imidazole based condensation catalysts may be incorporated into the present invention. The imidazole based condensation catalysts are represented by the formula $R^{15}NCR^{16}NCR^{17}CR^{18}$ where there is a carbon nitrogen single bond between the carbon atom which bonds to $R^{18}$ and the nitrogen atom which bonds to $R^{15}$ forming a ring structure. $R^{15}$, $R^{16}$, $R^{17}$, and $R^{18}$ are any combination of H, an acyl, a nitrile group, a hydroxy group, a trialkylsilyl group, a trialkoxysilyl group, an alkyl group, alkyl ether group, alkylene group, aryl group where each of which may possess from about 1 to 15 carbon atoms (when $R^{15}$, $R^{16}$, $R^{17}$, and/or $R^{18}$ is not H, a nitrile group, or a hydroxy group) or another $-NR_2^{14}$ group, where $R^{14}$ is described above. $R^{15}$, $R^{16}$, $R^{17}$, and $R^{18}$ can also combine to form ring structures which may or may not incorporate heteroatoms such as N, O, S, Si, and P.

Examples of condensation catalysts of the present invention include, but are not limited to ammonia, methyl amine, ethyl amine, diethyl amine, triethyl amine, benzyl dimethyl amine imidazole, 2-methyl imidazole, 2-ethyl imidazole, 2-propyl imidazole, 1-cyanoethyl-2-methylimidazole, formamide, N,N-dimethyl formamide, methyl amide, ethyl amide, dicyandiamide, and hexamethyldisilazane. The optional condensation catalysts of the present invention which are preferred are either solids at room temperature or volatile enough to be most removed during the curing step. High boiling liquid condensation catalysts such as benzyl dimethyl amine are not preferred since they may remain in the coating composition as a liquid and adversely affect the abrasion resistance. The solid condensation catalysts which are preferred may also act as a second phase composite filler which reinforces the sol-gel matrix and increases the modulus of the overall material. Dicyandiamide is an example of a preferred condensation catalyst. It is also a preferred embodiment of the present invention to use either an aqueous or aqueous-organic NaOH or KOH solution or basic colloidal silica to adjust the pH of the coating composition above 3.75 combined with the addition of a solid condensation catalyst. After addition of the condensation catalysts, one may lower the pH of the composition by addition of a strong acid. This will benefit the performance properties of the coating composition over time. The preferred final pH range of the coating composition is 2.5 to 4.5.

The optional silane additives of the present invention may be present in the coating composition at a concentration of 1 to 90 percent of the total solids of the composition. The optional silane additives may be represented by the formula $(R^{19})_x Si(OR^{20})_{4-x}$; where x is an integer equal to 1, 2, 3, or 4 and $R^{19}$ is any combination of H, an alkyl group, an hydroxyalkyl group, an alkylamino group, an alkylaminoalkyl group, an alkylamido group, an alkylamidoalkyl group, an alkylether group, an alkylene group, an alkyloxycarboxy group, an alkyloxycarboxyl group, and/or an aryl group; where each of which may contain from at least 1 to 15 carbon atoms (when $R^{19}$ is not H). $R^{20}$ can be any combination of H, an alkyl group, an alkylene group, an alkyl ether group, where each may contain from at least 1 to 15 carbon atoms (when $R^{20}$ is not H) and/or an $(R^{21})_y(OR^{22})_{3-y}Si-$ group, where y is an integer equal to 1, 2, or 3 and $R^{21}$ is any combination of H, an alkyl group, an hydroxyalkyl group, an alkylamino group, an alkylaminoalkyl group, an amidoalkyl group, an alkylamidoalkyl group, alkylether group, alkylene group, an alkyloxycarboxy group, an alkyloxycarboxyl group, and/or an aryl group where each may contain from at least 1 to 15 carbon atoms (when $R^{21}$ is not H). $R^{22}$ can be any combination of H, an alkyl group, an alkylene group, an alkyl ether group, where each may contain from at least 1 to 12 carbon atoms (when $R^{22}$ is not H) and/or another $(R^{21})_y(OR^{22})_{3-y}Si-$ group. The optional silane additive of the present invention can also be represented by the formula $(R^{23}SiO)_x(OR^{24})_y$; where if x is an integer of 8 or 12, then y is 0. If x is 6 then y is 0 or 8 and if x is 7, y is 3. Alternatively, the formula $(R^{23}SiO)_x(OR^{24})_y$ may be designated $R^{23}$ $TX(OR^{24})_y$. $R^{23}$ is any combination of H, an alkyl group, an hydroxyalkyl group, alkyl ether group, alkylene group, and/or an aryl group; where each of which may contain from at least 1 to 15 carbon atoms (when $R^{23}$ is not H). $R^{24}$ can be any combination of H, an alkyl group, an alkylene group, an alkyl ether group, where each may contain from at least 1 to 15 carbon atoms (when $R^{24}$ is not H). Either $R^{23}$ or $R^{24}$ may also be represented by the formula $(R^{19})_x Si(OR^{20})_{4-x}$, (vide supra).

Examples of optional silane additives of the present invention include but are not limited to tetra-methoxy silane, tetra-ethoxy silane, tetra-propoxy silane, tetra-butoxy silane, tetra-pentoxy silane methyl trimethoxy silane, methyl triethoxy silane, ethyl trimethoxy silane, ethyl triethoxy silane, hydroxymethyl trimethoxy silane, hydroxyethyl trimethoxy silane, hydroxymethyl triethoxy silane, hydroxyethyl triethoxy silane, hydroxypropyl triethoxysilane, hydroxypropyl trimethoxysilane, 3-(2,3-dihydroxypropyloxy)propyl trimethoxysilane, 3-(2,3-dihydroxypropyloxy)propyl triethoxysilane, 3-(2,3-dihydroxypropyloxy)propyl trihydroxysilane, acryloxymethyl trimethoxysilane, acryloxyethyl trimethoxysilane, methacryloxymethyl trimethoxysilane, methacryloxyethyl trimethoxysilane, acryloxypropyl trimethoxysilane, methacryloxypropyl trimethoxysilane, acryloxymethyl triethoxysilane, acryloxyethyl triethoxysilane, methacryloxymethyl triethoxysilane, methacryloxyethyl triethoxysilane, acryloxypropyl triethoxysilane, methacryloxypropyl triethoxysilane, methacryloxypropyltris (trimethylsiloxy)silane, methacryloxypropylmethyldiethoxysilane, methacryloxypropylmethyldimethoxysilane, acryloxypropylmethyldiethoxysilane, acryloxypropylmethyldimethoxysilane, methacryloxypropyltris(trimethylsiloxy)silane, methacryloxypropyltris(vinyldimethoxy)silane, tetrakis(2-methacryloxyethoxy)silane, allyl trimethoxysilane, allyl triethoxysilane, diallyl dimethoxysilane, diallyl diethoxysilane, triallyl methoxysilane, triallyl ethoxysilane, vinyl trimethoxysilane, vinyl triethoxysilane, divinyl dimethoxysilane, divinyl diethoxysilane, trivinyl ethoxysilane, trivinyl methoxysilane, tetrakis(vinyldimethylsiloxy)silane, tetraallylsilane, tetravinylsilane, 1,1,3,3-tetravinyldimethylsiloxane, octaallyl-T8-POSS, octavinyl-T8-POSS, octamethyl-T8-POS S, octaethyl-T8-POSS, octaphenyl-T8-POSS, methacryloxypropyl-heptacyclopentyl-T8-POSS, 2-hydroxy-4-(3triethoxysilylpropoxy)-diphenylketone, 3-isocyanopropyltriethoxysilane, 3-(N-allylamino)propyltrimethoxysilane, diethylphosphatoethyltriethoxysilane, phenyl trimethoxysilane, phenyl triethoxysilane, diphenyl dimethoxysilane, diphenyl diethoxysilane, trimethoxysilane, dimethoxysilane, methoxysilane, triethoxysilane, diethoxysilane, ethoxysilane, dimethoxymethyl silane, dimethoxyethyl silane, diethoxymethyl silane, diethoxyethyl silane, dimethyldiethoxy silane, diethyldiethoxy silane, dimethyldimethoxy silane, diethyldimethoxy silane, uriedopropyltrimethoxysilane, uriedopropyltriethoxysilane, aminomethyltrimethoxysilane, aminoethyltrimethoxysilane, aminomethyltriethoxysilane, aminoethyltriethoxysilane, aminopropyltrimethoxysilane, and aminopropyltriethoxysilane.

The optional organic functional additives of the present invention may be present in the coating composition at a concentration of 1 to 90 percent of the total solids of the composition. The optional organic functional additives may be represented by the formula $(R^{25})_xC(OR^{26})_{4-x}$; where x is an integer equal to 1, 2, 3, or 4 and $R^{25}$ is any combination of H, an hydroxy group, a mercapto group, an amino group, an alkylamino group, a carboxyl group, a carboxy group an alkyl group, an epoxyalkyl group, a glycidoxyalkyl group, an acryloxyalkyl group, a methacryloxyalkyl group, an hydroxyalkyl group, an aminoalkyl group, an alkylaminoalkyl group, an amidoalkyl group, an alkylamidoalkyl group, an alkyl ether group, an alkylene group, an alkyloxycarboxy group, an alkyloxycarboxyl group, and/or an aryl group; where each of which may contain from at least 1 to 40 carbon atoms (when $R^{25}$ is not H, an hydroxy group, an amino group, or a mercapto group). $R^{26}$ can be any combination of H or an alkyl group, an epoxyalkyl group, a glycidoxyalkyl group, an acryloxyalkyl group, a methacryloxyalkyl group, an hydroxyalkyl group, an alkylamino group, an alkylamido group, an alkylamidoalkyl group, an alkylether group, an alkylene group, an alkyloxycarboxy group, an alkyloxycarboxyl group, and/or an aryl group; where each may contain from at least 1 to 40 carbon atoms, when $R^{26}$ is not H, and/or another $(R^{27})_y(OR^{28})_{3-y}C—$ group.

Examples of organic functional additives of the present invention include, but are not limited to dipropylene glycol diacrylate, dipentaerythritol hydroxy pentaacrylate, glycerol triacrylate, trimethylolpropane triacrylate, trimethylolethane triacrylate, ethoxylated trimethylolpropane triacrylate, ethoxylated trimethylolethane triacrylate, tripropylene glycol diacrylate, 1,6-hexanediol diacrylate, 1,4-butanediol diacrylate, 1,6-hexanediol dimethacrylate, 1,4-butanediol dimethacrylate, dipropylene glycol dimethacrylate, dipentaerythritol hydroxy pentamethacrylate, glycerol trimethacrylate, trimethylolpropane trimethacrylate, trimethylolethane trimethacrylate, ethoxylated trimethylolpropane trimethacrylate, ethoxylated trimethylolethane trimethacrylate, tripropylene glycol dimethacrylate, hydroxyethyl methacrylate, hydroxyethyl acrylate, ethyl glycidyl ether, butyl glycidyl ether, phenyl glycidyl ether, vinyl glycidyl ether, allyl glycidyl ether, glycidyl methacrylate, glycidyl acrylate, 3,4-epoxycyclohexylmethyl-3,4-epoxycyclohexane carboxylate, 1,4 butanediol diglycidyl ether, 1,5 neopentyl glycol diglycidyl ether, trimethyolethane trisglycidyl ether, trimethylolpropane trisglycidyl ether, vinyl alcohol, vinyl glycidyl ether, vinylbenzene, divinylbenzene, lactones, substituted lactones, and like organic functional additives. One may also incorporate aliphatic and aromatic urethanes and ureas, polyols, aliphatic and aromatic urethane acrylate and urea acrylate materials, polyester and polyester acrylate materials, and generally any organic functional additive which combined with the composition of the present invention, will provide a coating composition. UV absorbing molecules may also be incorporated into the composition to prevent yellowing and degradation upon exposure to UV radiation which occurs during outdoor weathering. One who is skilled in the art will realize that the amount of water present in the coating composition will have a large influence on the compatibility of the organic functional additive.

Optionally, colloidal silica materials of the present invention may be present in the coating composition at a concentration of 1 to 90 percent of the total solids of the composition. It is preferred that the colloidal silica materials of the present invention posses an average diameter less than or equal to 75 nanometers. In order to preserve the transparency of the cured coatings of the present invention, it is more preferred that the colloidal silica contained in the coating compositions of the present invention possess an average diameter less than or equal to 50 nanometers. These materials can either be dispersed in aqueous, alcoholic, ethereal, acrylic, and or hydrocarbon solvent systems or any combination of aqueous, alcoholic, ethereal, and or hydrocarbon solvent systems. The colloidal silica materials of the present invention may also be dispersed in the organic functional additives. The colloidal silica materials of the present invention may act as composite reinforcing materials in addition to the basic colloidal silica materials which also may act as condensation catalysts.

Examples of colloidal silica materials of the present invention include, but are not limited to Nalco-1042, Nalco-1130, Nalco-1115, Nalco-1030, Nalco-1140, Nalco-2326, Nalco-1050, Nalco-1060, Nalco-2327, from Ondeo Nalco Company, Ludox-HS-30, from WR Grace, OG 1-32, OG 502-30, OG 101-31, OG 108-32, OG 113-53, OG121-31, from Clariant and IPAST and MAST from Nissan Chemical.

Optionally, the coating compositions of the present invention may contain a metal oxide composite colloid material. The incorporation of this material into the coating composition of the present invention enables one to effectively adjust the composite refractive index of the liquid composition and thus cured coating composition to substantially correspond to that of the substrate to which it is applied. The preferred refractive indices of the metal oxide composite colloidal material are above 1.6. The composition of the optional metal oxide composite colloid of the present invention may include, but are not limited to any combination of antimony oxide, silicon oxide, aluminum oxide, titanium oxide, zirconium oxide, tin oxide, tungsten oxide, and any other oxide which may be combined to form a metal oxide composite material with a refractive index of greater than or equal to 1.6.

Examples of the metal oxide composite colloidal material of the present invention include, but are not limited to HIT-30M, HIT-32M, HIS-33M, HX-300M, HX-300M1, HX-305M, HX-305M1, AMT-130S, from Nissan Chemical, and Optolake 1130F-2(A-8), 2130F-2(A-8), Queen titanic 11-1, from Catalyst and Chemical Industries LTD.

The coating compositions of the present invention may also contain surfactants and flow modifiers which improve the flow, leveling, and surface characteristics of the coated article, and in general enhance the overall cosmetics of the coated article. The surfactants and flow modifiers of the coating composition may also improve the adhesion of the cured coating to the article. One who is skilled in the art will realize that the properties affected by the incorporation of surfactants and flow modifiers will be dependent on the amount and type of surfactant and or flow modifier incorporated into the coating composition.

As is known in the art, it is sometimes favorable to have an intermediate radical or cationic polymerization step of an organic portion of the coating composition after application onto the article before a thermal cure step. These systems are referred to as dual or multi-cure systems. In order to achieve a free radical or cationic polymerization step, the composition must possess functional groups which can be polymerized by either radical or cationic polymerization processes. These processes result when cationic or free radical photoinitiators, upon exposure to UV radiation, at an appropriate energy, generate radical and or cationic species which in turn initiate the respective polymerization processes. Free radical and cationic polymerization processes can also be initiated by electron beam (EB) curing techniques. Cationic photoinitiators are needed to generate cationic species which propagate cationic polymerization processes while using EB curing techniques. Unsaturated Optional silane additives, and/or optional organic additives which possess the appropriate functional group or groups required for the polymerization step can be introduced into the coating composition to provide the polymerized organic network. Also, one may achieve desired results with an effective concentration of the epoxy-functional silane and addition of an appropriate amount of a cationic photoinitiator. Favorable properties and material structures can result by using any sequential combination of the organic polymerization and thermal condensation steps and different combinations, concentrations, and types of polymerizable monomers and photoinitiators. Any radical and or cationic photoinitiator which is compatible with the composition of the current invention and provides a polymerized organic network that is compatible with the matrix of the coating composition can be used with the composition.

Examples of optional radical photoinitiators of the present invention include, but are not limited to anthraquinone, benzophenone, substituted benzophenones, benzoin, benzoin alkyl ethers, 1-hydroxycyclohexyl phenyl ketone, 2-hydroxy-2-methylpropiophenone, acetophenone, substituted acetophenones, benzoyl-diphenylphosphine oxides, substituted benzoyl-diphenylphosphine oxides, di benzoyl-diphenylphosphine oxides, and substituted di benzoyl-diphenylphosphine oxides. Examples of optional cationic photoinitiators of the present invention include but are not limited to aryldiazonium, diaryliodonium, triarylsulfonium, dialkylphenacylsulphionium, triarylsulfoxionium, aryloxydiarylsulphoxonuim, and dialkylphenacylsulphoxonium salts. The anionic moiety of the cationic photoinitiator of the present invention is selected from the group; tetrafluoroborate, hexafluorophosphate, hexafluoroarsenate, and heaxfluoroantimonate anions. One who is skilled in the art will realize that the emission spectrum of the lamp must correspond to the absorption spectrum of the photoinitiator for an efficient and thorough cure. Radical and cationic photoinitiators are commercially available from Sartomer, Ciba-Geigy, Dow Chemical, and BASF.

The coating compositions of the present invention can be applied to a substrate by dip, spin, flow, spray or roll coating procedures, which are well known practices in the art. This leaves a coating film which, when cured utilizing conventional curing techniques known in the art, including all known thermal and UV curing techniques, provides an abrasion resistant coating. As will be understood, the performance properties of the cured coating depend on the length of time and temperature of the curing cycle and the hardness and flexibility of the substrate to which the coating is applied. The described application of the present invention is particularly well suited for use in fabricating lenses, and in particular optical or ophthalmic lenses. However, this does not restrict this invention as to its applicability to other types and sizes of substrates. For example, other substrates may include metal and plastic sheet and irregular shaped objects which posses a surface for application of a coating. Some substrates, such as polycarbonate, may require the use of a primer to aid in the adhesion of the coating composition to the substrate and other substrates such as poly (diethylene glycol-bis-allyl) carbonate (CR-39) may require a caustic etch. Alternative surface treatments, such as plasma etch or CR-scrub may also be used to provide a substrate surface which is amenable to application and adhesion of the coating composition. After the coated article is cured it is helpful to check the adhesion of the cured coating using the procedures outlined in ASTM D-3359.

The abrasion resistance of the coated and cured lenses of the present invention is described by the Bayer ratio which is the quotient of the reference haze to the sample haze wherein the reference is a CR-39 plano lens. Thus a coated and cured article with a Bayer ratio of one has an abrasion resistance equal to that of the CR-39 reference. The abrasion resistance of the coated and cured ophthalmic lenses of the present invention was evaluated using the Standard Method for the Modified Bayer Test which is described in the AR Council of America standard testing procedures section 5.2.5. The cleaning procedure was further modified by rinsing both the sample and reference lenses with either acetone or isopropyl alcohol and wiping dry with a lens cleaning cloth or a cheese cloth.

Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention.

EXPERIMENTAL SECTION

As an illustration, several non-restrictive examples of coating compositions conforming to the invention are given below. All chemicals were used as purchased from the manufacturer and used without further purification. All water was deionized unless specified otherwise. The lenses used were either comprised of poly (diethyleneglycol-bis-allylcarbonate); CR-39, or polycarbonate. Before application of the coating, the CR-39 lenses were etched by contact with a 10 percent solution of either potassium hydroxide or sodium hydroxide dissolved in a 1:1 mixture of water and PM-alcohol for a period of about 10 minutes. The coatings were applied onto the lenses by either spin coating or dip coating. The preferred procedure for spin coating consists of applying the coating composition across the center of a lens spinning at 600 revolutions per minute (RPM) and slowly moving the application stream to and past the edge of the spinning lens. After application, the lens was spun at a rate to 1500 RPM for ca. 10 seconds. The coated lens was either air dried for a period of up to 30 minutes or immediately cured for a desired period of time at a specified temperature. The preferred procedure for dip coating a lens consists of immersing a lens into the coating composition for a period of up to 10 seconds followed by withdrawing the lens and a desired rate and placing the lens into a curing oven for processing at a desired time and temperature. The performance properties of the compositions of the present invention are best maintained over time by storing at a temperature of 4 C or lower.

EXAMPLES

Example 1A

To a stirring solution of 51.54 grams of propylene-glycol methyl ether (PM-alcohol), 51.54 of grams de-ionized water, and 0.46 grams of phosphoric acid was added 20.29 grams of Glycidoxypropyltrimethoxysilane (GPTMS). After stirring for a period of 2 hours, 66.17 grams of bis(triethoxysilyl)ethane (BSE) was added to the mixture. This mixture was stirred overnight. 0.19 grams of neat FC-4430 was then added and the mixture was stirred for an additional 2 hours to yield a coating composition. This composition was applied onto an etched CR-39 plano lens spinning at a rate of 600 RPM. Immediately after application the spin rate was increased to 1500 RPM for a period of 10 seconds. The coated lens was placed into an oven and cured for a period of 3 hours at 120° C. to afford a cured coating with a thickness of 2.3 microns.

Example 1B

To 24.91 grams of the composition described in Example 1A was added 0.09 grams of dicyandiamide (DCDA). After stirring for approximately 14 hours, the coating composition was applied onto an etched CR-39 plano lens using the procedure described in Example 1A to yield a cured coating with a thickness of 2.3 microns and a Bayer value of 7.5.

Example 2A

To a stirring solution of 50.76 grams of PM-alcohol, 50.76 of grams de-ionized water, and 0.53 grams of phosphoric acid was added 23.07 grams of GPTMS. After stirring for a period of 2 hours, a stirred mixture of 50.15 grams of BSE and 14.73 grams of Tetraethoxysilane (TEOS) was added to the mixture. The mixture was stirred overnight. 0.19 grams of neat FC-4430 was then added and the mixture was stirred for an additional 2 hours to yield a coating composition. This composition was applied onto an etched CR-39 plano lens spinning at a rate of 600 RPM. Immediately after application the spin rate was increased to 1500 RPM for a period of 10 seconds. The coated lens was placed into an oven and cured for a period of 3 hours at 120° C. to afford a cured coating with a thickness of 2.5 microns.

Example 2B

To 24.79 grams of the composition described in Example 2A was added 0.21 grams of DCDA. After stirring for approximately 14 hours, the coating composition was applied to an etched CR-39 plano lens using the procedure described in Example 2A to yield a cured coating with a thickness of 2.3 microns and a Bayer value of 10.1.

Example 3A

To a stirring solution of 53.02 grams of PM-alcohol, 53.02 of grams de-ionized water, and 0.62 grams of phosphoric acid was added 23.22 grams of GPTMS. After stirring for a period of 3.5 hours, a stirred mixture of 46.47 grams of BSE and 13.65 grams of Tetraethoxysilane (TEOS) was added and the mixture was stirred overnight. 0.19 grams of neat FC-4430 was then added and the mixture was stirred for an additional 2 hours to yield a coating composition.

Example 3B

To 45 grams of the composition described in Example 3A was added 0.49 grams of a 4.8 weight percent solution of NaOH in de-ionized water to adjust the pH of the composition to 3.9. This mixture was stirred for approximately 16 hours to provide a coating composition which was applied onto an etched CR-39 plano lens spinning at a rate of 600 RPM. Immediately after application the spin rate was increased to 1500 RPM for a period of 10 seconds. The coated lens was placed into an oven and cured for a period of 3 hours at 120° C. to afford a cured coating with a thickness of approximately 2 to 2.5 microns and a Bayer value of 3.6.

Example 3C

To 25 grams of the composition described in Example 3B was added 0.153 grams of DCDA approximately 2 hours after the addition of the NaOH solution. This mixture was stirred for approximately 14 hours to provide a coating composition which was applied onto an etched CR-39 piano lens spinning at a rate of 600 RPM. Immediately after application the spin rate was increased to 1500 RPM for a period of 10 seconds. The coated lens was placed into an oven and cured for a period of 3 hours at 120° C. to afford a cured coating with a thickness of approximately 2.2 microns and a Bayer value of 8.9.

Example 3D

To the remaining 145 grams of the composition described in Example 3A was added 1.9 grams of a 4.8 percent solution of NaOH in de-ionized water to adjust the pH of the composition to 4.2. This mixture was stirred for approximately 18 hours to provide a coating composition which was applied onto an etched CR-39 piano lens spinning at a rate of 600 RPM. Immediately after application the spin rate was increased to 1500 RPM for a period of 10 seconds. The coated lens was placed into an oven and cured for a period of 3 hours at 120° C. to afford a cured coating with a thickness of approximately 2 to 2.5 microns and a Bayer value of 4.4.

Example 3E

To 25 grams of the composition described in Example 3D was added 0.153 grams of DCDA approximately 2 hours after the addition of the NaOH solution. This mixture was stirred for approximately 16 hours to provide a coating composition which was applied onto an etched CR-39 plano lens spinning at a rate of 600 RPM. Immediately after application the spin rate was increased to 1500 RPM for a period of 10 seconds. The coated lens was placed into an oven and cured for a period of 3 hours at 120° C. to afford a cured coating with a thickness of approximately 2.2 microns and a Bayer value of 8.9.

Example 3F

To 25 grams of the composition described in Example 3D was added 0.153 grams of DCDA approximately 2 hours after the addition of the NaOH solution. After stirring for an additional 2 hours, 1 drop of concentrated sulfuric acid was added to adjust the pH of the composition to approximately 2.6. This mixture was stirred for approximately 16 hours to provide a coating composition which was applied onto an etched CR-39 plano lens spinning at a rate of 600 RPM. Immediately after application the spin rate was increased to 1500 RPM for a period of 10 seconds. The coated lens was placed into an oven and cured for a period of 3 hours at 120° C. to afford a cured coating with a thickness of approximately 2.1 microns and a Bayer value of 6.3.

Example 3G

To 25 grams of the composition described in Example 3D was added 0.153 grams of DCDA approximately 2 hours after the addition of the NaOH solution. After stirring for an additional 2 hours, 1 drop of concentrated nitric acid was added to adjust the pH of the composition to approximately 2.6. This mixture was stirred for approximately 16 hours to provide a coating composition which was applied onto an etched CR-39 plano lens spinning at a rate of 600 RPM. Immediately after application the spin rate was increased to 1500 RPM for a period of 10 seconds. The coated lens was placed into an oven and cured for a period of 3 hours at 120° C. to afford a cured coating with a thickness of approximately 2.0 microns and a Bayer value of 8.0.

Example 4A

To a stirring solution of 310.12 grams of PM-alcohol, 391.88 of grams de-ionized water, and 4.12 grams of phosphoric acid was added 153.09 grams of GPTMS. After stirring for a period of 6.5 hours, a stirred mixture of 170.25 grams of BSE and 50.01 grams of TEOS was added to the mixture. The mixture was stirred overnight. To this vigorously stirred mixture was added 115.36 grams of Nalco-1130 by very slow stream. After stirring overnight, 5.17 grams of DCDA was added to the mixture. After stirring for an additional 45 minutes to dissolve the DCDA, 1.15 grams of neat FC-4430 was added and the mixture was stirred overnight to yield a coating composition. This composition was applied onto an etched CR-39 plano lens spinning at a rate of 600 RPM. Immediately after application the spin rate was increased to 1500 RPM for a period of 10 seconds. The coated lens was placed into an oven and cured for a period of 3 hours at 110° C. to afford a cured coating with a thickness of 1.4 microns and a Bayer value of 6.2.

Example 4B

To 200 g of the composition described in Example 4A was added 8 to 13 drops of concentrated nitric acid to adjust the pH of the mixture from 4.2 to about 3. This mixture was stirred overnight to yield a coating composition. This composition was applied onto an etched CR-39 plano lens spinning at a rate of 600 RPM. Immediately after application the spin rate was increased to 1500 RPM for a period of 10 seconds. The coated lens was placed into an oven and cured for a period of 3 hours at 110° C. to afford a cured coating with a thickness of 1.4 microns and a Bayer value of 5.8.

Example 5A

To a stirring solution of 116 grams of PM-alcohol, 116 of grams de-ionized water, and 2.36 grams of di-nonylnaphthalene-di-sulfonic acid was added 46.14 grams of GPTMS. After stirring for a period of 5 hours, a stirred mixture of 92.36 grams of BSE and 27.13 grams of TEOS was added to the mixture. The mixture was stirred overnight. To this mixture was added 0.382 grams of FC-4430 and the resulting composition was stirred an additional 2 hours to yield a coating composition.

Example 5B

To 24.86 grams of the composition described in Example 5A was added 0.138 grams of DCDA. This mixture was stirred overnight to yield a coating composition. This composition was applied onto an etched CR-39 plano lens spinning at a rate of 600 RPM. Immediately after application the spin rate was increased to 1500 RPM for a period of 10 seconds. The coated lens was placed into an oven and cured for a period of 3 hours at 110° C. to afford a cured coating with a thickness of 1.9 microns and a Bayer value of 4.2.

Example 5C

To 150 grams of the composition described in Example 5A was added 0.5 grams of a 5.55 weight percent solution of NaOH to adjust the pH of the composition to 4.3. This mixture was stirred overnight to provide a coating composition which was applied onto an etched CR-39 plano lens spinning at a rate of 600 RPM. Immediately after application the spin rate was increased to 1500 RPM for a period of 10 seconds. The coated lens was placed into an oven and cured for a period of 3 hours at 110° C. to afford a cured coating with a thickness of 1.9 microns and a Bayer value of 2.4.

Example 5D

To 24.86 grams of the composition described in Example 5C was added 0.138 grams of DCDA approximately 2 hours after the addition of the NaOH solution. This mixture was stirred overnight to provide a coating composition which was applied onto an etched CR-39 piano lens spinning at a rate of 600 RPM. Immediately after application the spin rate was increased to 1500 RPM for a period of 10 seconds. The coated lens was placed into an oven and cured for a period of 3 hours at 110° C. to afford a cured coating with a thickness of approximately 1.7 microns and a Bayer value of 6.0.

Example 6

0.24 grams of Sartomer 6976 was added to 20 grams of the composition described in Example 4B. The mixture was stirred for a period of 4 hours and was applied onto an etched CR-39 piano lens spinning at a rate of 600 RPM. Immediately after application the spin rate was increased to 1500 RPM for a period of 10 seconds. The coated lens was cured using a Fusion F-300 system equipped with an H$^+$ bulb at 1.8 joules. After which, the lens was placed into an oven and cured for a period of 3 hours at 110° C. to afford a cured coating with a thickness of approximately 1.4 microns and a Bayer value of 6.1.

Example 7A

To a stirring solution of 70.94 grams of PM-alcohol, 56.14 of grams de-ionized water, and 0.75 grams of phosphoric acid was added 27.71 grams of GPTMS. After stirring for a period of 4 hours, a stirred mixture of 15.41 grams of BSE and 18.11 grams of TEOS was added and the mixture was stirred overnight. To this mixture was added 0.937 grams of DCDA and the mixture was stirred an additional 6 hours followed by addition of 0.18 grams of neat FC-4430.

Example 7B

To 40 grams of the composition described in Example 7A was added 13.806 grams of HX-300M1 from Nissan Chemical. This mixture was stirred overnight to provide a coating composition which was applied onto an etched CR-39 plano lens spinning at a rate of 600 RPM. Immediately after application the spin rate was increased to 1500 RPM for a period of 10 seconds. The coated lens was placed into an oven and cured for a period of 3 hours at 110° C. to afford a cured coating with a thickness of approximately 1.2 microns, a refractive index of approximately 1.55, and a Bayer value of 4.2.

Example 7C

To a stirring solution of 68.65 grams of PM-alcohol, 54.32 of grams de-ionized water, and 0.72 grams of phosphoric acid was added 26.82 grams of GPTMS. After stirring for a period of 4 hours, a stirred mixture of 29.82 grams of BSE and 8.76 grams of TEOS was added and the mixture was stirred overnight. To this mixture was added 0.906 grams of DCDA and the mixture was stirred an additional 6 hours followed by addition of 0.18 grams of neat FC-4430.

Example 7D

To 40 grams of the composition described in Example 7C was added 14.666 grams of HX-300M1 from Nissan Chemical. This mixture was stirred overnight to provide a coating composition which was applied onto an etched CR-39 plano lens spinning at a rate of 600 RPM. Immediately after application the spin rate was increased to 1500 RPM for a period of 10 seconds. The coated lens was placed into an oven and cured for a period of 3 hours at 110° C. to afford a cured coating with a thickness of approximately 1.5 microns, a refractive index of approximately 1.55, and a Bayer value of 3.5.

What is claimed is:

1. A composition for forming a coating upon a substrate when applied and cured thereon, said composition comprising:
    (a) an epoxy-functional silane;
    (b) a multipodal silane;
    (c) a strong acid; and
    (d) a solvent;
    (e) wherein said epoxy-functional silane is present in a molar ratio to said multipodal silane that ranges from between 0.3:1 to 0.7:1.

2. The composition of claim 1 wherein said solvent is selected from the group consisting of an aqueous solvent, an organic solvent, and a non-polar liquid.

3. The composition of claim 2 wherein said organic solvent is selected from the group consisting of an alcohol, an ether, a cyclic ether, and a ketone.

4. The composition of claim 1 wherein said strong acid is present in a molar ratio to said epoxy-functional silane that ranges from between 0.01:1 to 0.5:1.

5. The composition of claim 1 wherein said molar ratio of said strong acid to said epoxy-functional silane is from between 0.02:1 to 0.15:1.

6. The composition of claim 1 wherein said strong acid is selected from the group consisting of phosphoric acid, phosphorous acid, sulfuric acid, sulfurous acid, nitric acid, nitrous acid, and alkyl and aryl sulfonic and di-sulfonic acids.

7. A composition for forming a coating upon a substrate when applied and cured thereon, said composition comprising:
    (a) an epoxy-functional silane;
    (b) a multipodal silane;
    (c) a strong acid;
    (d) a solvent; and
    (e) a condensation catalyst selected from the group consisting of an amine condensation catalyst and an amide condensation catalyst.

8. The composition of claim 1 wherein said composition further comprises at least one silane additive.

9. The composition of claim 1 wherein said composition further comprises at least one organic functional additive.

10. The composition of claim 1 wherein said composition further comprises colloidal silica.

11. The composition of claim 10 wherein said colloidal silica includes particulate silica having an average diameter no greater than 75 nanometers.

12. The composition of claim 11 wherein said average diameter of said particulate silica is no greater than 50 nanometers.

13. The composition of claim 1 wherein said composition further comprises a metal oxide composite colloid material.

14. The composition of claim 1 wherein said composition further comprises at least one surfactant.

15. The composition of claim 7 wherein said solvent is selected from the group consisting of an aqueous solvent, an organic solvent, and a non-polar liquid.

16. The composition of claim 15 wherein said organic solvent is selected from the group consisting of an alcohol, an ether, a cyclic ether, and a ketone.

17. The composition of claim 7 wherein said strong acid is present in a molar ratio to said epoxy-functional silane that ranges from between 0.01:1 to 0.5:1.

18. The composition of claim 7 wherein said molar ratio of said strong acid to said epoxy-functional silane is from between 0.02:1 to 0.15:1.

19. The composition of claim 7 wherein said strong acid is selected from the group consisting of phosphoric acid, phosphorous acid, sulfuric acid, sulfurous acid, nitric acid, nitrous acid, and alkyl and aryl sulfonic and di-sulfonic acids.

20. The composition of claim 7 wherein said composition further comprises at least one silane additive.

21. The composition of claim 7 wherein said composition further comprises at least one organic functional additive.

22. The composition of claim 7 wherein said composition further comprises colloidal silica.

23. The composition of claim 22 wherein said colloidal silica includes particulate silica having an average diameter no greater than 75 nanometers.

24. The composition of claim 23 wherein said average diameter of said particulate silica is no greater than =nanometers.

25. The composition of claim 7 wherein said composition further comprises a metal oxide composite colloid material.

26. The composition of claim 7 wherein said composition further comprises at least one surfactant.

* * * * *